United States Patent [11] 3,632,268

| | | | | |
|---|---|---|---|---|
| [72] | Inventor | Henry Pomernacki Northbrook, Ill. | | |
| [21] | Appl. No. | 875,882 | | |
| [22] | Filed | Nov. 12, 1969 | | |
| [45] | Patented | Jan. 4, 1972 | | |
| [73] | Assignee | Illinois Tool Works, Inc. Chicago, Ill. | | |

[54] WEB-CLAMPING APPARATUS
5 Claims, 4 Drawing Figs.

[52] U.S. Cl. .................................................. 425/348, 425/350
[51] Int. Cl. .................................................. B29c 17/00
[50] Field of Search .......................................... 18/19 F, 19 R, 19 P, 20 C, 20 R, 20 RR, 21, 4 S, 5 D, DIG. 48

[56] References Cited
UNITED STATES PATENTS

| | | | |
|---|---|---|---|
| 2,027,915 | 1/1936 | Kux ............................. | 18/20 R |
| 2,745,135 | 5/1956 | Gora ............................ | 18/5 D X |
| 2,915,784 | 12/1959 | Gora ............................ | 18/20 R |
| 3,069,725 | 12/1962 | Root............................ | 18/20 RR X |
| 3,091,808 | 6/1963 | Dakin.......................... | 18/19 F |
| 3,105,270 | 10/1963 | Fibish......................... | 18/19 R |
| 3,218,379 | 11/1965 | Edwards...................... | 18/19 F X |
| 3,234,594 | 2/1966 | Winstead..................... | 18/4 S |
| 3,235,639 | 2/1966 | Knowles...................... | 18/19 F X |
| 3,418,691 | 12/1968 | Hanai.......................... | 18/20 RR |

*Primary Examiner*—J. Howard Flint, Jr.
*Attorneys*—Robert W. Beart, Michael Kovac, Barry L. Clark and Jack R. Halvorsen ABSTRACT: In a continuous motion container molding machine for forming thin-wall, disposable, plastic containers, circumferential, opposed web clamping means are arranged to provide angular and rotational displacement thereof after being clamped to a moving web of heated thermoplastic material traveling in a linear path, thereby permitting the web-clamping means to move in a predetermined arcuate path and enabling containers to be formed from the area of the web within the circumferential, opposed web-clamping means.

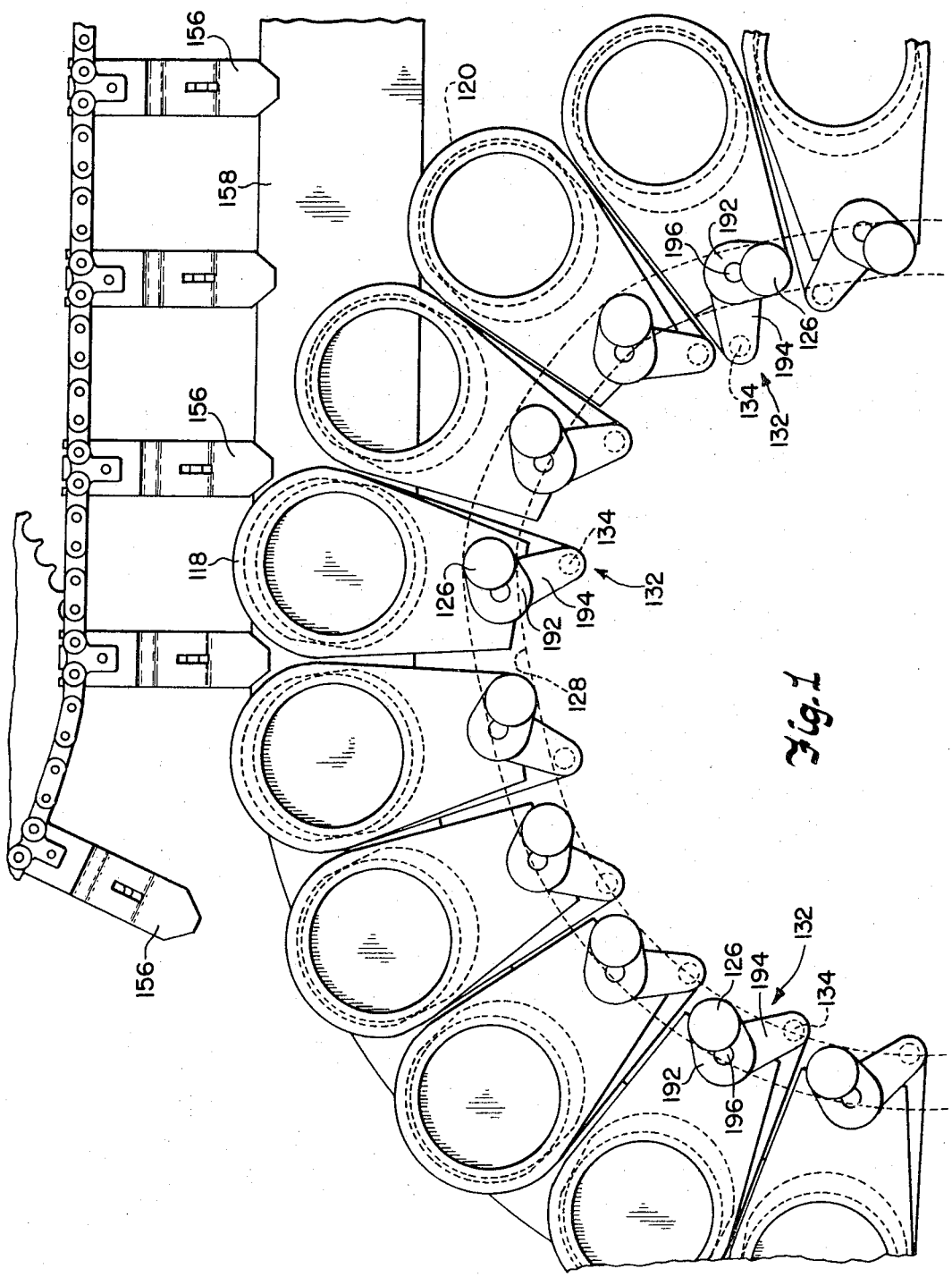

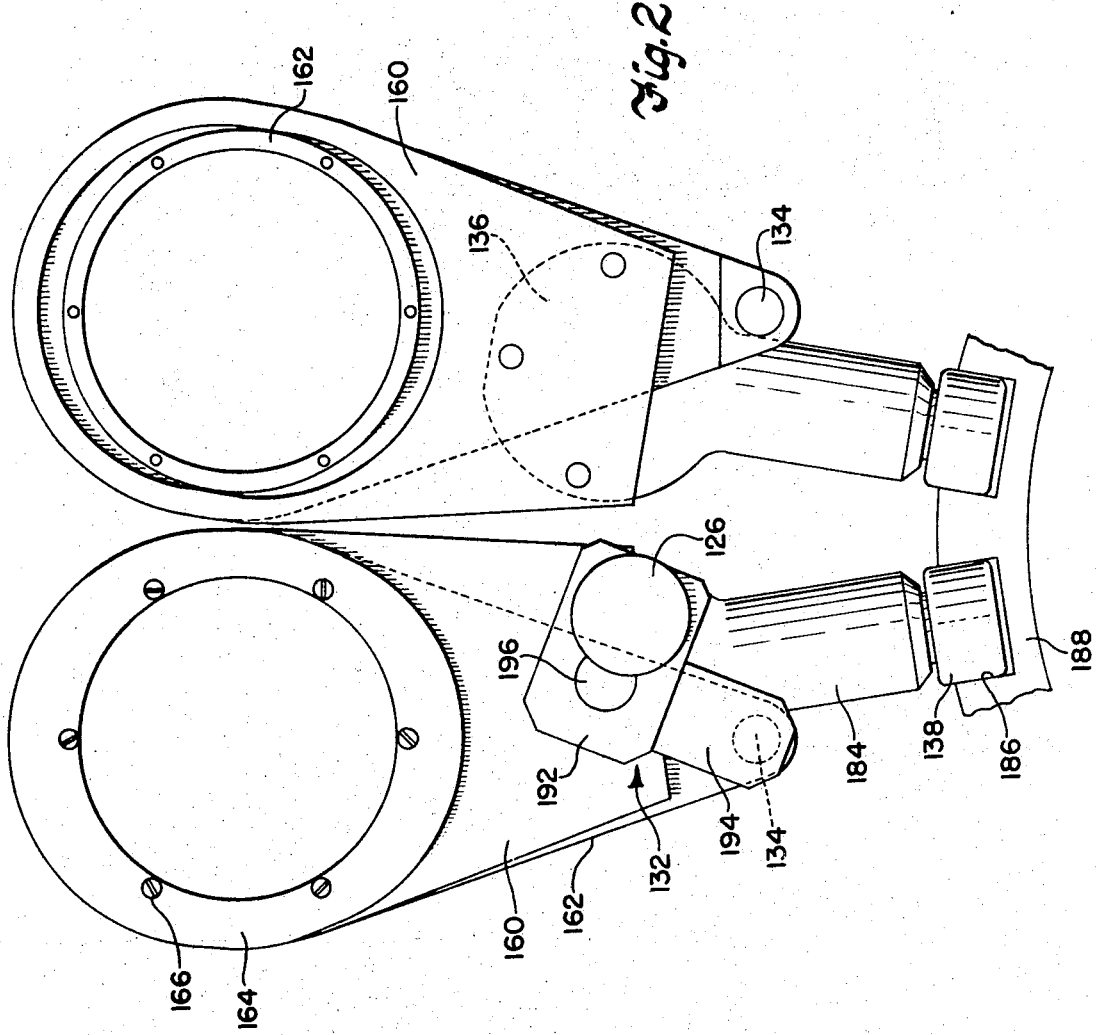

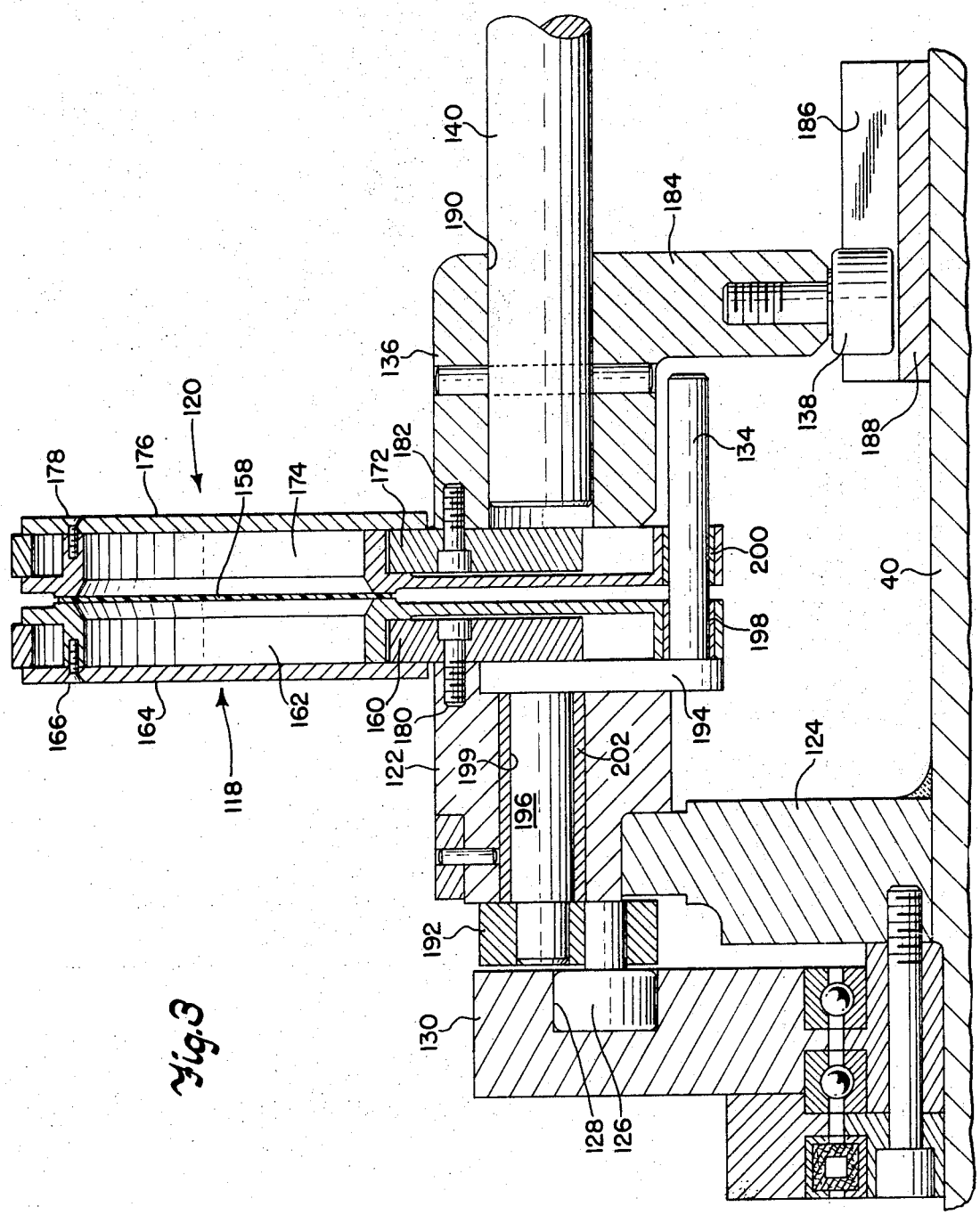

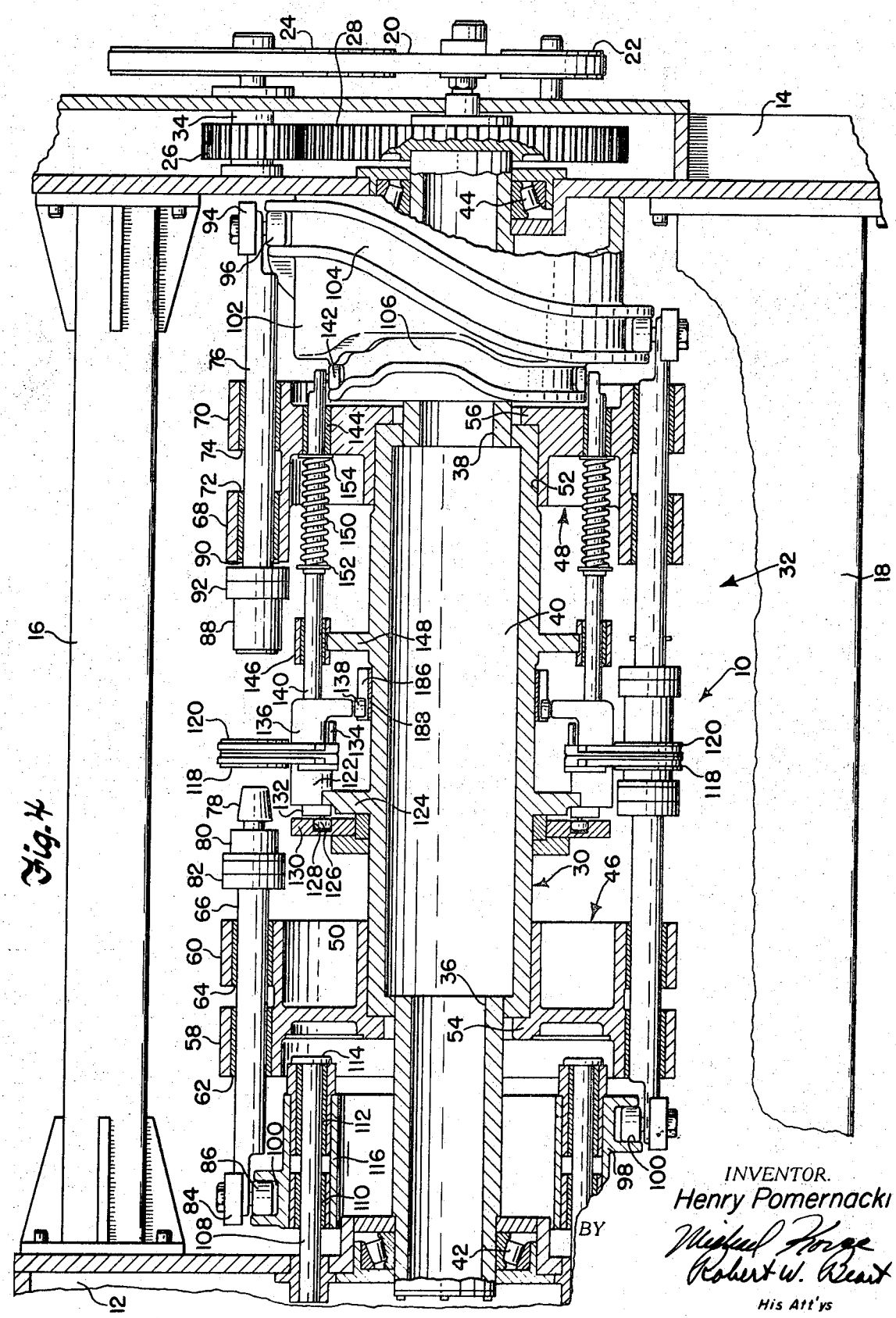

WEB-CLAMPING APPARATUS

This application is a companion to patent application Ser. No. 845,270, filed July 28, 1969, in the name of Bryant Edwards and assigned to the same assignee as the present application. The companion Edwards' application discloses and claims the basic technique for causing a moving web of heated plastic material traveling in a linear path to be clamped to a rotary molding station for predetermined arcuate movement therewith. The present invention is directed to the preferred form of web-clamping apparatus which is disclosed in the companion Edwards' application and which provides the desired angular and rotational displacement of the web-clamping means once clamped to the heated web of thermoplastic material.

In the companion Edwards' application, a continuous motion container molding machine and method is disclosed as having rotating cooperating molds which operate upon heated thermoplastic sheet or web material to form disposable containers. In general, the continuous molding machine or method includes the steps or means for feeding a heated thermoplastic web to at least one pair of continuously rotating cooperating molds, simultaneously attaching the web to the molds for predetermined, coincidental movement therewith and clamping off a predetermined material area from the remainder of the web, and then forming containers from the predetermined material area when attached to the cooperating molds.

The heated web of thermoplastic material is conveyed along a linear path, and in order to transfer the web to the continuously rotating cooperating molds at the rotary molding station, it is necessary for circumferential, opposed web clamping means to engage and clamp the web, while moving in its linear path, with the web-clamping means being capable of angular and rotational displacement relative to the web for predetermined simultaneous movement along a coincidental path of the web. In this way, the web can be transferred from a linear to an arcuate path where cooperating molds associated with the rotary molding station are arranged to form containers from the web material which is clamped by the web-clamping means. The present invention is directed to one way in which apparatus may be designed for causing angular and rotational displacement of web-clamping means to permit the transfer from the linear path to the arcuate path of the rotary molding station.

It is an object of the present invention to assure the transfer of a heated web of plastic material from a linear to an arcuate path.

Another object of the present invention is the provision of web clamping means which positively clamps and releases a heated thermoplastic web for predetermined arcuate movement thereof.

These and other objects and advantages of the present invention are attained by providing in a continuous motion container molding machine which forms containers from a generally vertically oriented heated web of material traveling in a linear path to a rotary molding station wherein the station includes circumferential, opposed web-clamping means for causing synchronized movement of the web with the rotary molding station along a predetermined arcuate path and cooperating molds for operating upon the web within the circumferential web-clamping means to form containers, the improvement which comprises means for angularly and rotationally displacing the web-clamping means after clamping of the web for predetermined arcuate movement of the web relative to the rotary molding station, said last-mentioned means including a bellcrank mechanism which both angularly and rotationally displaces one of the circumferential, opposed web-clamping means and a common shaft interconnecting the circumferential, opposed web-clamping means for simultaneous movement of the other circumferential, opposed web-clamping means.

Reference is now made to the drawing wherein:

FIG. 1 is a fragmentary side elevational view illustrating the web clamping means of the container molding station in conjunction with the web-conveying apparatus;

FIG. 2 is an enlarged fragmentary elevational view of part of the web-clamping means of the container molding station;

FIG. 3 is also an enlarged elevational and sectional view of the web-clamping means mounted on the container molding station; and FIG. 4 is a fragmentary sectional view of the container molding station as viewed along a substantially vertical plane section thereof.

In order to understand the functioning and operation of the web-clamping apparatus, it will be helpful to first have in mind the structure and operation of the container molding station 10. This station is best illustrated in FIG. 4 of the drawing. The container molding station 10 includes upright, generally opposed frame elements 12, 14 which are interconnected by upper and lower supporting beams 16, 18. A motor (not shown) is mounted at one side of the container molding station and drives an endless belt 20 which is entrained about motor guide pulley 22 and frame supported guide pulley 24, the latter in turn driving the upper spur gear 26 which meshes in toothed engagement with the lower spur gear 28 for driving or rotating the shaft 30 upon which the rotary drum 32 is mounted. It will be appreciated that the guide pulley 24 and the upper spur gear 26 are suitably journaled on a frame supported shaft 34 while the lower spur gear 28 is fixedly mounted in an external fashion about the rotary drum shaft 30 at one end thereof.

The rotary drum shaft 30 is illustrated in FIG. 4 as comprising a three-piece shaft having hollow, relatively smaller shaft sections 36, 38 at opposite ends thereof which are supported by the frame elements of the machine, and a hollow, relatively larger intermediate shaft section 40 which supports the web clamps and cooperating molds. The hollow three-piece rotary drum shaft 30 is utilized for carrying cooling tubes or the like which are connected to the cooperating molds for cooling the container product after forming thereof.

The relatively smaller, hollow shaft sections 36, 38 are supported at the outermost ends thereof by tapered roller-bearing assemblies 42, 44 respectively which are, in turn, supported by the upright, vertical frame elements 12, 14 respectively at opposite ends of the container molding station 10. The innermost portions of each of the relatively smaller, hollow shaft sections 36, 38 are mounted within complementary configured openings at opposite ends of the relatively larger, hollow shaft section 40.

The intermediate rotary drum shaft section 40 fixedly mounts, at opposite ends thereof, cylindrical mandrel and mold cavity supporting platens 46, 48 respectively. The mandrel and mold supporting platens 46, 48 are provided with central openings 50, 52 respectively, which are complementary configured relative to the external configuration and dimension of the intermediate shaft section 40, and may be either frictionally locked together or have means for restraining either rotary or lateral movement of the mandrel and mold supporting platens 46, 48 relative to the intermediate shaft section 40. Toward this latter end, it will be noted that the mandrel and mold-supporting platens 46, 48 respectively include, adjacent the central openings 50, 52 thereof, inwardly extending flanges 54, 56 respectively which aid in preventing movement of the mandrel and mold-supporting platens 46, 48 toward one another.

Each of the mandrel and mold-supporting platens 46, 48 at the outermost periphery thereof include axially aligned, spaced journal supports with associated bushing elements. Specifically, the mandrel supporting platen 46 includes axially spaced journal supporting sections 58, 60 into which are mounted associated bushings 62, 64 respectively for reciprocally mounting the mandrel shaft 66. In the case of the mold-supporting platen 48, the axially spaced journal supports 68, 70 include associated bushings 72, 74 which reciprocally mount the mold shafts 76.

The manner in which the mandrel and mold shafts 66, 76 respectively carry the cooperating mold elements and move with respect to one another is best seen in FIG. 4 of the drawing. Considering first the mandrel shaft 66, it will be noted that the innermost or forward end thereof includes a mandrel or plug 78, a mandrel block 80 including cutting elements, if desired, and a mandrel supporting block 82. At the rear or outermost end of the mandrel shaft 66, there is provided a rear shaft guide block 84 and a cam follower 86 on opposite sides thereof. In the case of the mold cavity shaft 76, the forward or innermost end thereof includes the mold cavity 88 having associated therewith cutting elements complementary to those carried by the mandrel block 80, if desired, a container ejector or knockout plug mechanism 90 and a mold cavity supporting block 92. The rear or outermost end of the mold cavity shaft 76 has associated therewith at opposite sides thereof a rear mold cavity shaft guide block 94 and a cam follower 96.

During the forward and rearward movement of the mandrel and mold cavity shafts 66, 76, the axially spaced journal supporting sections 58, 60 in the case of the mandrel shafts 66 and the axially spaced journal supporting sections 68, 70 associated with the mold cavity shafts 76 assure essentially linear movement of the cooperating mandrels and mold cavities 78, 88 respectively and associated parts thereof. The rear mandrel and mold cavity shaft guide blocks 84, 94 respectively include complementary surfaces or interfitting portions on adjacent shaft guide blocks to prevent any rotary movement of the shafts 66, 76 during the rotary movement of the container molding station 10. In this way, the cooperating mandrels and mold cavities 78, 88 respectively will move toward and away from one another without any adverse influence from centrifugal forces during the rotation of the container molding station 10.

Reciprocating movement of the mandrel and mold cavity shafts 66, 76 is achieved by the movement of the cam followers 86, 96 in a cam slot or track. For this purpose, there is provided a mandrel barrel cam 98 having a cam slot or track 100 in which the cam followers 86 of each mandrel shaft 66 ride. A mold cavity barrel cam 102 is also provided and has formed therein a cam slot or track 104 in which the cam followers 96 of the mold cavity shafts 76 ride. The mold cavity barrel cam 102 further includes a cam slot or track in which guide followers of the web-clamping mechanism ride as will be presently described.

The mold cavity barrel cam 102 is fixedly mounted to the upright frame support 14 at the right-hand side of the machine as viewed in FIG. 4 of the drawing. The mandrel barrel cam 98 is also fixedly mounted relative to the rotary drum shaft 30, but permits limited lateral movement of the cam, together with the mandrel shafts 66 in the event of web jam-up or other such occurrence. In this regard, it will be noted that the mandrel barrel cam 98 is nonrotatively supported relative to the frame element 12 at the left-hand side of the container molding station 10 in FIG. 4 of the drawing by a plurality of fixed shafts 108 which are journaled in the frame element 12. Each of the shafts 108 includes spaced bearing-bushing assemblies 110, 112 respectively supporting the rotary fixed shafts 108 for limited lateral movement between the enlarged head 114 at the free end of the shafts 108 and the innermost face or surface of the upstanding frame support 12. An annular support member 116 couples the shafts 108 and bearing-bushing assemblies 110, 112 to one another to provide circumferential support for the mandrel barrel cam 98. In order to provide the limited lateral movement of the mandrel barrel cam 98 along the shafts 108, means (not shown) preferably coupled to the circuit of the machine is provided to laterally displace the mandrel barrel cam 98 in the event of web jam-up or other similar occurrence.

In order to achieve the fabrication of substantially uniform-in-thickness, thin-wall plastic containers with no weakened or unnecessarily thickened portions, it is necessary that a predetermined material section of a heated web of thermoplastic material be clamped on opposite sides thereof prior to engagement by the cooperating molds. The specific manner in which the clamps operate in a continuous motion machine will be described in detail below, but it is important to understand the environmental setting in which the clamps are mounted on the container molding station 10. This can be best understood by again referring to FIG. 4 of the drawing which shows generally opposed pairs of circumferential web-clamping means 118, 120 intermediate the mandrel and mold cavity 78, 88 respectively. The circumferential web-clamping means 118, 120 are designed to clamp a predetermined material section of the web in a circumferential manner about the peripheries of the mandrel and mold cavity 78, 88 respectively to permit these cooperating molds to operate upon the predetermined material section in a manner to be described.

The web clamp 118 is supported by the web-supporting block 122 which, in turn, is supported by the upstanding external flange 124 integrally connected to the intermediate shaft section 40 of the rotary drum shaft 30. In order to permit rotary and angular adjustment of the web clamps 118, 120 as will be described below, a cam follower 126 which rides in the cam slot 128 of the face cam 130 is connected to a bellcrank mechanism 132 partially shown in FIG. 4 of the drawing which will be more specifically described in connection with FIGS. 1-3 of the drawing. Controlled angular and rotary movement of the web clamp 120, along with the web clamp 118, is achieved by the common shaft 134 at one end of the bellcrank mechanism 132.

Web clamp 120 is vertically supported by the intermediate shaft section 40 by way of the web-supporting block 136 and the web guide roller 138 which rides in a guide slot which is generally parallel with the axis of the rotary drum shaft 30.

Each web clamp 120 is reciprocated relative to the web clamp 118 by way of the shaft 140 which is connected at one end to the web clamp block 136 and at the other end is provided with a cam follower 142 which is guided in the cam slot or track 106 formed in the mold cavity barrel cam 102. The shaft 140 is journaled adjacent the cam follower end in a bushing 144 and adjacent the other end is supported in a bushing-bearing assembly 146, in turn, supported by an externally projecting integral flange 148 of the intermediate shaft section 40. Each mold clamp 120 is normally biased in a clamped position relative to the mold clamp 118 as the result of the helical coil spring 150 which is maintained in a compressed state by the spring clamping plates 152, 154, thereby urging the shaft 140 and its associated web clamp 120 into clamped arrangement with its respective web clamp 118. As the cam follower 142 follows the cam slot 106, the helical coil spring is further compressed, thereby opening up the web clamps 118, 120 as will be understood.

With the understanding of the structure and operation of the container molding station 10 in mind, it will be easier to understand the web-clamping apparatus with which the present invention is concerned.

The web conveyor clips 156, as seen in FIG. 1, are disengaged from the web 158 in sequential fashion as the circumferential web-clamping means 118, 120 are sequentially attached to the web 158. For a specific description of the structure and operation of the web-clamping means, reference is hereby made to U.S. application Ser. No. 875,880, filed Nov. 12, 1969, in the name of Walter C. Diener and assigned to the same assignee as the present application. The transfer of the web 158 from the web conveyor clips 156 to the circumferential web-clamping means 118, 120 is an important part of the continuous motion molding operation for a number of reasons. The web 158 follows a vertically oriented, linear path while being fed by the web conveyor clip means 156, and after clamping by the circumferential web-clamping means 118, 120 is then caused to move in a predetermined arcuate path about the container molding station 10. This necessitates the clamping of the web by the circumferential web-clamping means 118, 120 along a coincidental path when synchronized with the speed of the web in order to assure predetermined, simultaneous movement of the web 158 and web-clamping means 118, 120 along a predetermined arcuate path. Failing to clamp the web 158 in the manner just described as it is converted from linear to arcuate movement will cause undesirable stretching and fold lines in the web which will result in unnecessarily thin or thickened sections in the ultimately formed container. These difficulties can be avoided by clamping off a predetermined material area of the web 158 by the circumferential web-clamping means 118, 120 before the web 158 begins its arcuate movement, thereby segregating selected web areas which can be operated upon by the cooperating mold to form containers. Any stretching or material folding outside of the circumferentially clamped areas does not interfere with the molding operation or create undesired thinned or thickened sections in the container that is formed.

The structural components of the web clamping means and its operation can best be understood by reference to FIGS. 1-3 of the drawing. In FIG. 1 of the drawing, the movement of the adjacent pairs of web clamps 118, 120 through a circumferential path, including both arcuate and linear movement of the web clamps 118, 120 during rotation thereof is illustrated. The web clamps 118, 120 are mounted on the container molding station 10 as illustrated in FIG. 4 of the drawing, such that the web clamps will be rotated in the general vicinity of the moving web 158. When the web clamps 118, 120 are synchronized with the speed of the moving web 158, means are employed to assure coincidental movement of the web clamps 118, 120 along a linear path coinciding with the moving web in order to permit clamping of the web 158 by the web clamps 118, 120 when they are traveling in the same path at the same speed. In general, the means employed to assure coincidental, synchronized movement of the web clamps 118, 120 and the moving web 158 comprises a cam follower 126 for each web clamp means 118, 120 which rides in a cam slot 128 of the face cam 130 which is axially fixedly mounted to the intermediate shaft section 40 of the rotary drum shaft 30 as can be seen in FIGS. 3 and 4 of the drawing. Each cam follower 126 is attached to a bellcrank mechanism 132, to be presently described, which provides rotational and angular adjustment of each pair of web clamps 118, 120 in order that it may assume a coincidental path synchronized with the speed of the web 158 prior to clamping thereof. The shape and position of the cam slot 128, together with the relative positionment of the cam follower and its associated bellcrank mechanism 132 for pairs of web clamps 118, 120 at different relative circumferential positions about the container molding station 10 can be best seen in FIG. 1 of the drawing.

Referring now to FIG. 3 of the drawing, it will be seen that each web clamping mechanism comprises a pair of generally opposed, circumferential web-clamping elements 118, 120 which cooperate together to clamp off a predetermined material area of the web 158 as discussed above. Web clamp 118 includes a clamp ring holder 160 which supports the movable clamping ring 162, the latter, in turn, having a retaining ring 164 which is attached thereto by the fastening means 166 to prevent any horizontal movement of the clamp ring 162. Similarly, the web clamp 120 includes a clamp ring holder 172 which supports the clamping ring 174 with the clamping ring 174 being attached to the retaining ring 176 by the fastening means 178 to restrict horizontal movement of the clamp ring 174 relative to the clamp ring holder 172.

Clamp ring holder 160 is attached, by the fastening means 180, to the web clamp supporting block 122 which, in turn, is supported by the external flange 124 of the intermediate shaft section 40 forming part of the rotary drum shaft 30. The web clamp supporting block 122 includes a transverse opening for receiving part of the bellcrank mechanism 132 as will presently be described.

The clamp ring holder 172 of clamp ring 120 is attached, by way of the fastening means 182, to the web clamp supporting block 136 which includes a depending leg 184 attached to a guide roller 138 riding in a guide slot 186 which is generally parallel with the axis of the rotary drum shaft 30 as can be understood by comparing FIGS. 2-3 of the drawing. Each guide slot 186 is formed in a ring guide slot member 188 attached to the intermediate shaft section portion 40 of the rotary drum shaft 30. The web clamp supporting block 136 is also provided with a transverse opening as is the case with the web supporting block 122 supporting the clamp ring 118, but in the case of the web clamp supporting block 136, the transverse aperture or opening 190 thereof receives a shaft 140 which is retained therein by suitable means. As pointed out in connection with FIG. 4 of the drawing, shaft 140 is connected to a cam follower 142 which is guided in the cam slot or track 106 provided in the mold cavity barrel cam 102 and controls the reciprocating movement of the mold clamp 120 from a normally closed position in clamping engagement with the web 158 to a position where the web clamps 118, 120 are separated from one another.

The bellcrank mechanism 132 includes a first arm 192 which is attached to the cam follower 126, a second arm 194 laterally spaced therefrom and offset at a 90° angle relative to the first arm 192, a connecting shaft 196 which connects the first and second arms 192, 194 of the bellcrank 132, and a shaft 134 common to both of the web clamps 118, 120 and journaled in bushings 198, 200 of the web clamps 118, 120 respectively adjacent the lower ends thereof. Connecting shaft 196 extends through the opening 199 in the web supporting block 122 and is mounted within the bushing 202 for limited rotational movement thereof. Shaft 134, common to both web clamps 118, 120, provides relative sliding movement therealong as well as providing limited rotational movement of the clamp rings 162, 174 along the lower end thereof.

It will be apparent, when comparing FIGS. 1-3, that each cam follower 126 as it moves along the cam slot or track 128 moves the first bellcrank arm 192 in different angular positions, and since the second bellcrank arm 194 is connected thereto by the shaft 196 at a 90° offset position relative to the first crank arm 192, the second bellcrank arm 194 will be moved in different angular positions 90° out of phase with the different angular positions of the first bellcrank arm 192. The various angular positions of the second bellcrank arm 194 will be transmitted through the common shaft 134, thereby causing both vertical and angular movement of the web clamps 118, 120 as each cam follower 126 thereof is moved in the cam slot 128.

The web clamp mechanism for each pair of web clamps 118, 120, in addition to providing angular and rotational movement thereof relative to the moving web 158 in order to assume a coincidental path synchronized with the speed of the web prior to the clamping thereof, also provides circular movement of the web clamps 118, 120 in a predetermined arcuate path during the container forming operation. The web-clamping mechanism also is designed for low inertia and wear to enable operation thereof at high speeds.

Although a specific embodiment of the present invention has been shown and described, it is with full awareness that many modifications thereof in addition to those specifically mentioned are possible. The invention, therefore, is not to be restricted except in so far as is necessitated by the prior art and by the spirit of the appended claims.

1. In a continuous motion container molding machine for forming containers from a generally vertically oriented heated web of material traveling along a linear path to a rotary molding station which includes circumferential, opposed web-clamping means for causing synchronized movement of the web with the rotary molding station along a predetermined arcuate path and cooperating molds for operating upon the web within the circumferential web-clamping means to form containers, the improvement comprising means for angular and rotational displacement of said web-clamping means after clamping of said web for predetermined arcuate movement of said web relative to said rotary molding station, said last-mentioned means including a bellcrank mechanism which angularly and rotationally displaces one of said circumferential, opposed web-clamping means and a common shaft interconnecting said circumferential, opposed web-clamping means for simultaneous movement of the other of said circumferential, opposed web-clamping means.

2. The apparatus as defined in claim 1 wherein said bellcrank mechanism is attached to a cam follower which moves in a cam slot of predetermined shape.

3. The apparatus as defined in claim 2 wherein said bellcrank mechanism includes opposed bellcrank devices offset from one another at predetermined angles, one of said bellcranks being connected to said cam follower and said other bellcrank being connected to said common shaft.

4. The apparatus as defined in claim 1 wherein said circumferential, opposed web-clamping means are relatively moved toward and away from one another by the movement of a second cam follower which is connected to the web-clamping means that is interconnected by the common shaft to the other web-clamping means operated by the bellcrank mechanism.

5. The apparatus as defined in claim 1 including a plurality of web-clamping means and associated bellcrank mechanisms and common shafts which are circumferentially disposed about the rotary molding station.

* * * * *